Jan. 8, 1929.

L. P. STRONG 1,697,887

STEAM TRAP

Filed April 25, 1927

Inventor
Leslie P. Strong
By Brockett & Hyde
Attorneys

Patented Jan. 8, 1929.

1,697,887

UNITED STATES PATENT OFFICE.

LESLIE P. STRONG, OF LAKEWOOD, OHIO, ASSIGNOR TO THE CLARK MFG. COMPANY, OF CLEVELAND, OHIO, A CORPORATION OF OHIO.

STEAM TRAP.

Application filed April 25, 1927. Serial No. 186,515.

This invention relates to improvements in steam traps, and more particularly, to steam straps wherein the outlet valve is operated by a float of the inverted bucket type.

The general object of the present invention is the provision of an improved steam trap of the type described which is of extremely simple and inexpensive construction not likely to get out of order in service; in which the outlet valve is connected to its operating float by simple and direct connecting means; in which said float is provided with an improved arrangement of vent means; in which an additional outlet opening is provided which may be used as a test outlet to receive a support for the trap or to afford access to the removable valve seat member of the outlet valve structure; and which trap is efficient and satisfactory in use.

Further objects of the invention are in part obvious and in part will appear more in detail hereinafter.

Figure 1:
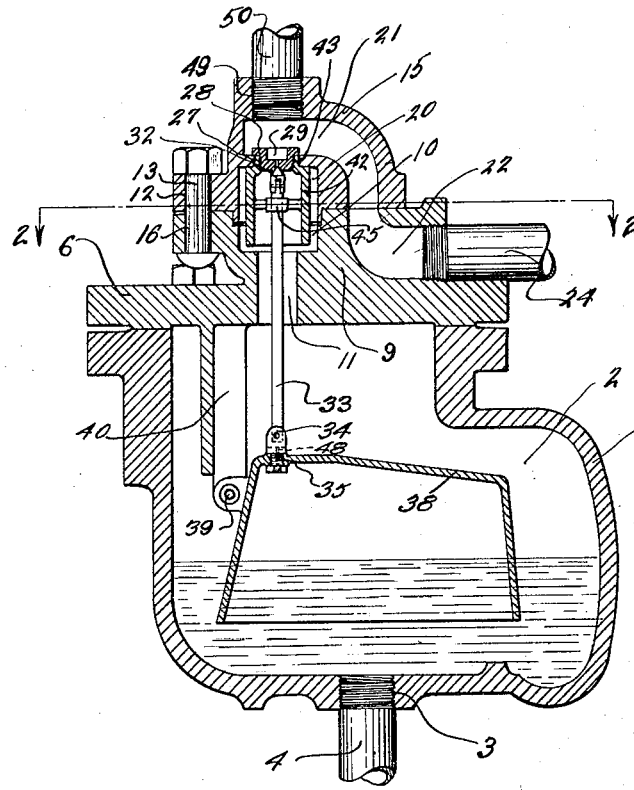
Figure 2:
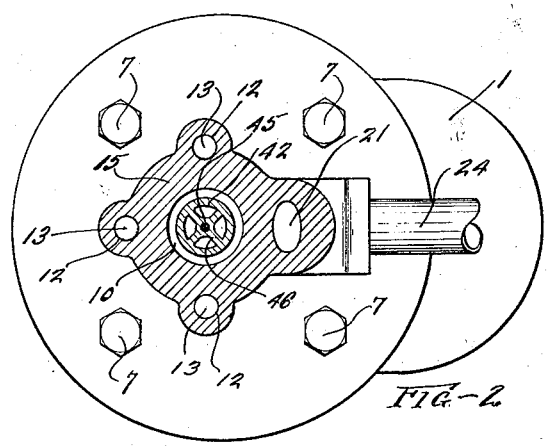
Figure 3:
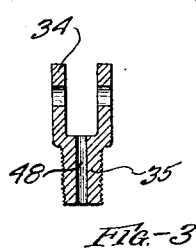

Referring to the drawings, which represent one suitable embodiment of the invention, Fig. 1 is a vertical sectional view of my improved steam trap; Fig. 2 is a cross sectional view thereof on the line 2—2, Fig. 1; and Fig. 3 is a detail sectional view of the clevis member which connects the outlet valve stem to the float.

The steam trap illustrated in the drawings includes a cup-like casing or body 1 having a float chamber 2 into which water, steam and air are adapted to flow through a centrally disposed opening 3 in the bottom of said casing, an inlet pipe 4 being threaded into or being otherwise suitably associated with said opening.

A cover member 6 is provided for the top of said casing, being removably secured thereto by any suitable means, such as the bolts 7. Said cover member is provided with a centrally disposed, raised or thickened portion 9, through which extends a substantially vertical opening having its upper portion 10 of slightly larger diameter than that of its lower portion 11. A series of suitably spaced radial slots 12, such as three, are provided in said raised portion around the opening thereof, to receive securing bolts 13 of a cap member 15. Said cap member is adapted to be removably mounted upon said cover portion 9, being provided with a suitably arranged series of openings 16 for said bolts. If desired, gaskets may be provided between the casing 1 and the cover member 6 and between said cover member and the cap member 15, as will be readily understood.

Said cap member is provided in its lower surface with a centrally arranged, vertically disposed opening 20 and with a passage 21 extending outwardly or radially from a point above said opening and thence downwardly to the lower surface of said cap member. When said cap member is mounted upon the cover member, as shown in the drawings, the cap opening 20 overlies and therefore communicates with the upper enlarged cover opening 10, and the lower end of passage 21 overlies and therefore communicates with the upper end of a substantially radially extending passage 22 in the thickened portion 9 of the cover member 6. A pipe 24 is threaded into or otherwise suitably associated with the outer end of said cover passage 22 and serves to carry away water supplied to the steam trap by the inlet pipe 4, as will later appear.

An opening 27 in the cap member provides communication between the upper end of opening 20 and the inner end of passage 21 and adjustably and removably arranged in said opening is a valve seat member 28 provided with a vertically disposed discharge port 29. Said port, which of course provides communication between opening 20 and passage 21, is controlled by a tapering valve member 32 loosely pinned or otherwise suitably mounted upon the reduced upper end of a vertically disposed valve stem 33. The lower end of said valve stem is pinned or otherwise suitably secured to the bifurcated upper end portion 34 of a clevis member having its cylindrical lower end portion 35 threaded into an opening in the top wall of a float member 38. Said float member is of inverted bucket form, with the side wall thereof pivoted at 39 to the lower end of a depending bracket 40 carried by the cover member 6. Vertical swinging movement of said float member, caused by the steam, air or water content of the float chamber 2, therefore produces vertical movement of the valve 32 and hence controls the discharge of material from the float chamber to passages 21 and 22 and discharge pipe 24, as will be readily understood.

To guide the valve stem 33 in its vertical movement, a tubular guiding member 42 is arranged within the vertically aligned openings 20 and 10 of the cap and cover members respectively, the upper end of said guiding member being threaded or otherwise removably secured to the inwardly extending annular flange portion 43 surrounding the opening 27 which provides communication between opening 20 and passage 21. Said guiding member is provided intermediate its ends with a centrally disposed guiding ring 45 surrounding the valve stem 33 and spaced from the cylindrical wall of said guiding member by radial arms 46, as clearly shown in Figs. 1 and 2. Preferably, and as shown, the valve seat member 28 is threaded in the upper end of said guiding member.

The float member 38 is provided in its upper portion with an air and steam vent, as is usual, and in the present embodiment of the invention, said vent is provided by a vertically disposed opening 48 in the lower cylindrical portion 35 of the clevis member which connects the valve stem 33 with the upper wall of the float member. It is therefore necessary to provide but a single opening in the wall of the float member and by making said clevis member of brass or the like, said vent opening will not be closed by rust, as might otherwise occur.

The cap member is also provided in its top wall with a centrally disposed opening 49 which overlies and therefore communicates with the inner end of passage 21. Said opening may receive pipe 50 for use in testing the trap or for supporting the same, or if more convenient or if desired, the pipe 50 may be used as the water outlet or discharge pipe in place of pipe 24 and the opening for said latter pipe may be used as a test opening or to receive a member for supporting the steam trap, as will be readily understood. By locating the cap opening 49 above the valve seat member 28, access to said member for inspection or removal of the same is readily afforded without the necessity of removing the cap member.

The steam trap operates in the same manner as other traps of this type, the steam, air and water entering the float chamber through the bottom inlet pipe 4. So long as water enters the float chamber, the float member 38 will remain in its lower position with consequent open condition of the valve controlled discharge port 29. The water entering said float chamber is therefore free to flow from said chamber through passages 21 and 22 to the outlet pipe 24. However, when steam or air enters the float chamber, the float will rise, with consequent closing of the discharge port 29. When said steam or air escapes, or when said steam condenses, the float will fall, thereby again opening the discharge port 29 and permitting the water in said float chamber to flow therefrom.

What I claim is:

1. A steam trap, comprising a casing having a top opening, a cover structure for said casing opening, a float chamber in said casing, a chambered float in said float chamber, a discharge port for said float chamber in said cover structure, a valve controlling the discharge through said port, and means connecting said valve to said float for operation thereby, said means being provided with a passage affording communication between said float chamber and the chamber of said float.

2. A steam trap, comprising a casing having a top opening, a cover structure for said casing opening, a float chamber in said casing, a chambered float in said float chamber, a discharge port for said float chamber in said cover structure, a valve controlling the discharge through said port and provided with a valve stem, and a single member connecting said valve stem to said float for operation thereby, said connecting member being provided with a passage affording communication between said float chamber and the chamber of said float.

3. A steam trap, comprising a casing having a top opening, a cover structure for said casing opening, a float chamber in said casing, a chambered float in said float chamber, a discharge port for said float chamber in said cover structure, a valve structure controlling the discharge through said port, and a non-rusting member connecting said valve structure to said float for operation thereby, said connecting member being provided with a passage affording communication between said float chamber and the chamber of said float.

In testimony whereof I hereby affix my signature.

LESLIE P. STRONG.